US009403427B2

(12) United States Patent
Haladyna et al.

(10) Patent No.: US 9,403,427 B2
(45) Date of Patent: Aug. 2, 2016

(54) METHOD AND SYSTEM FOR OIL DILUTION CONTROL

(71) Applicant: Ford Global Technologies, LLC, Dearborn, MI (US)

(72) Inventors: Ted Haladyna, Northville, MI (US); Douglas Raymond Martin, Canton, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 968 days.

(21) Appl. No.: 13/647,990

(22) Filed: Oct. 9, 2012

(65) Prior Publication Data

US 2014/0058647 A1 Feb. 27, 2014

Related U.S. Application Data

(60) Provisional application No. 61/693,147, filed on Aug. 24, 2012.

(51) Int. Cl.

| | |
|---|---|
| ***B60W 10/06*** | (2006.01) |
| ***B60K 6/48*** | (2007.10) |
| ***F02D 41/22*** | (2006.01) |
| ***F02D 29/02*** | (2006.01) |
| *F02D 13/02* | (2006.01) |
| *F02D 19/08* | (2006.01) |
| *F02D 41/00* | (2006.01) |
| *F02B 75/12* | (2006.01) |

(52) U.S. Cl.

CPC .................. *B60K 6/48* (2013.01); *B60W 10/06* (2013.01); *B60W 20/18* (2016.01); *F02D 29/02* (2013.01); *F02D 41/22* (2013.01); *B60W 2710/0688* (2013.01); *B60Y 2300/525* (2013.01); *F02B 2075/125* (2013.01); *F02D 13/0207* (2013.01); *F02D 19/084* (2013.01); *F02D 41/0025* (2013.01); *F02D 2041/224* (2013.01); *F02D 2041/228* (2013.01); *F02D 2250/11* (2013.01); *Y02T 10/123* (2013.01); *Y02T 10/36* (2013.01); *Y02T 10/6221* (2013.01)

(58) Field of Classification Search

CPC B60W 10/06; B60W 20/108; B60W 20/1086

USPC .................. 123/196 AB; 180/65.28; 701/113

See application file for complete search history.

(56) References Cited

U.S. PATENT DOCUMENTS

| | | | | |
|---|---|---|---|---|
| 7,043,402 | B2 | 5/2006 | Phillips et al. | |
| 2008/0167788 | A1* | 7/2008 | Tate ...................... | B60W 10/06 701/104 |
| 2009/0048728 | A1 | 2/2009 | Nunn et al. | |
| 2010/0300781 | A1 | 12/2010 | Leone | |
| 2012/0012076 | A1* | 1/2012 | Atkinson ............. | C10M 169/04 123/1 A |
| 2012/0042845 | A1* | 2/2012 | Kanai ...................... | F01M 1/10 123/196 AB |
| 2012/0145113 | A1 | 6/2012 | Mordukhovich | |

FOREIGN PATENT DOCUMENTS

| | | | |
|---|---|---|---|
| WO | 03054482 | A2 | 7/2003 |
| WO | 2006110356 | A3 | 10/2006 |

* cited by examiner

*Primary Examiner* — Erick Solis

(74) *Attorney, Agent, or Firm* — David Kelley; Alleman Hall McCoy Russell & Tuttle LLP

(57) ABSTRACT

Methods and systems are provided for operating an engine in a hybrid vehicle in response to fuel and water dilution of engine lubricating oil. An engine oil dilution counter may be adjusted based on a number of engine hot starts and duration of engine operation above a threshold temperature. In addition, the counter may be adjusted if the engine is started to deplete stale fuel in the fuel tank.

21 Claims, 6 Drawing Sheets

12
110
106
112
114
ROM
CPU
RAM
KAM
108
I/O
130
134
132
PP
EGO
8
FUEL SYSTEM
122
MAF
142
TP
MAP
DRIVER
168
PIP
180
178
174
144
176
162
124
FPW
ECT
164
146
116
118
155
166
120
SA
151
150
190
IGNITION SYSTEM
192
153
138
140
157
156
14
136
148
128
10

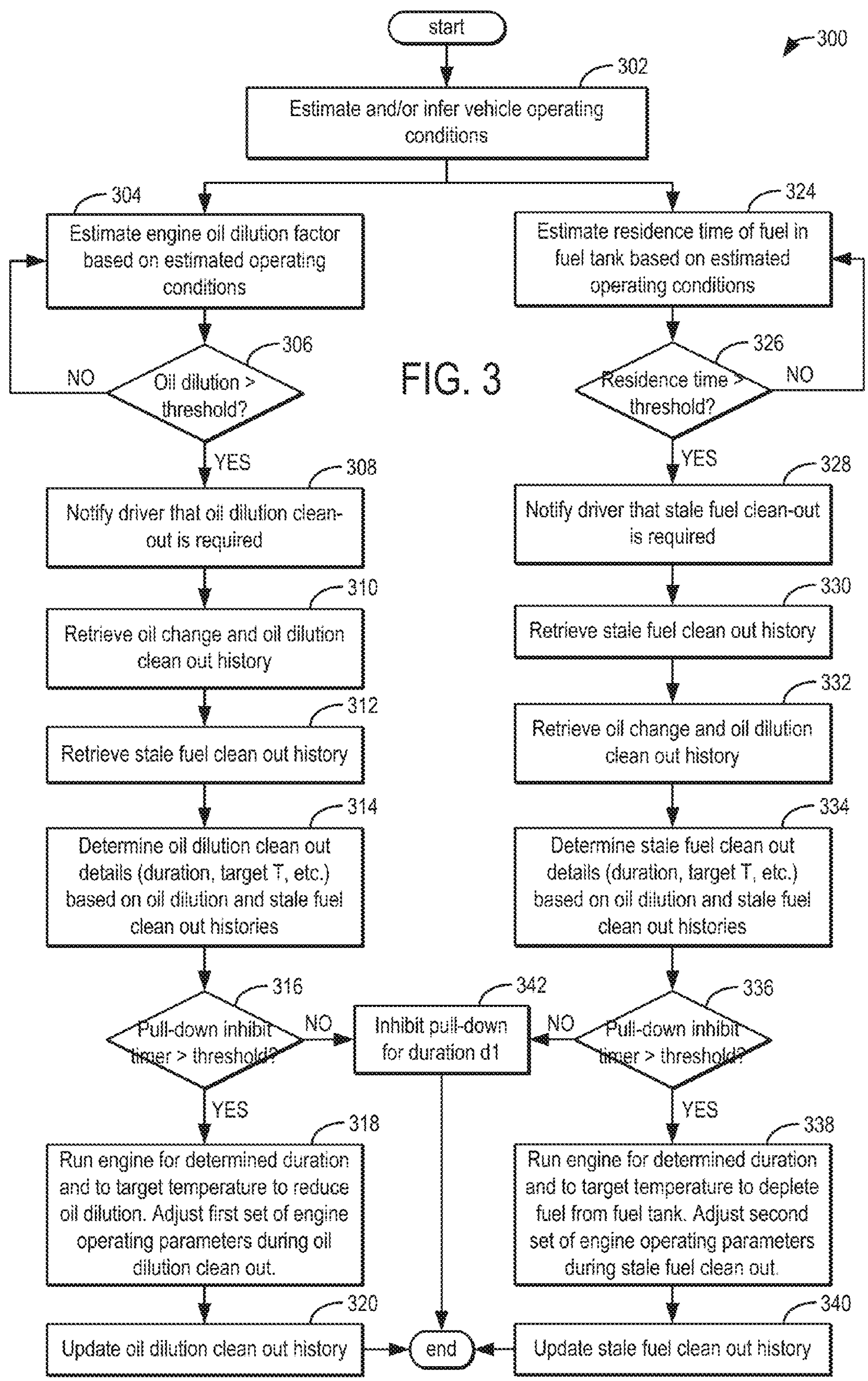

start
300
302
Estimate and/or infer vehicle operating conditions
304
Estimate engine oil dilution factor based on estimated operating conditions
324
Estimate residence time of fuel in fuel tank based on estimated operating conditions
306
Oil dilution > threshold?
NO
YES
FIG. 3
326
Residence time > threshold?
NO
YES
308
Notify driver that oil dilution clean-out is required
328
Notify driver that stale fuel clean-out is required
310
Retrieve oil change and oil dilution clean out history
330
Retrieve stale fuel clean out history
312
Retrieve stale fuel clean out history
332
Retrieve oil change and oil dilution clean out history
314
Determine oil dilution clean out details (duration, target T, etc.) based on oil dilution and stale fuel clean out histories
334
Determine stale fuel clean out details (duration, target T, etc.) based on oil dilution and stale fuel clean out histories
316
Pull-down inhibit timer > threshold?
NO
342
Inhibit pull-down for duration d1
NO
336
Pull-down inhibit timer > threshold?
YES
318
Run engine for determined duration and to target temperature to reduce oil dilution. Adjust first set of engine operating parameters during oil dilution clean out.
YES
338
Run engine for determined duration and to target temperature to deplete fuel from fuel tank. Adjust second set of engine operating parameters during stale fuel clean out.
320
Update oil dilution clean out history
end
340
Update stale fuel clean out history

METHOD AND SYSTEM FOR OIL DILUTION CONTROL

CROSS-REFERENCE TO RELATED APPLICATIONS

This application claims priority to U.S. application No. 61/693,147 filed on Aug. 24, 2012, the entire contents of which are hereby incorporated herein by reference for all purposes.

FIELD

The present application relates to fuel usage in vehicles, such as hybrid vehicles.

BACKGROUND AND SUMMARY

Hybrid electric vehicles (HEVs) and Plug-in HEVs (PHEVs) run primarily in an electric mode where the vehicle is propelled by an energy storage device (e.g., a battery). The vehicle may be operated in an engine mode only during selected conditions. As a result, depending on the vehicle drive cycle and the battery charging cycle, the engine may be operated infrequently. This causes fuel to reside in the fuel tank for prolonged durations.

Since fuel can degrade over time, various approaches may be taken to reduce the residence time of fuel in a fuel tank. For example, as elaborated by Leone in US 20100300781, an engine in a hybrid vehicle may be periodically operated to deplete the fuel, even though a system battery is sufficiently charged to operate the vehicle.

However the inventors herein have identified potential issues with such approaches. As one example, even if the engine is periodically started and operated to deplete the fuel, the operator may only partly fill a fuel tank more frequently to reduce what might be viewed as unnecessary engine operation. While this may reduce or avoid fuel degradation, engine oil dilution may be exacerbated. In particular, over the course of vehicle operation, fuel and water may contaminate engine lubricating oils. While at least some of the contaminating water can be removed (e.g., evaporated) during engine warm-ups, in HEVs and PHEVs, where engine run times are infrequent and not sufficiently long, engine temperatures may not be high enough to address the contaminating water. For example, even when the fuel is not stale, oil dilution may occur due to the engine being run with frequency cold starts to improve fuel economy. Even when the engine is periodically started to deplete stale fuel, the engine may not be operated hot enough to remove the contaminating water. Consequently, the diluted engine oil can lead to increased heat, decreased performance, excessive wear, and potential for component failure.

In one example, some of the above issues may be addressed by a method for an engine in a hybrid vehicle comprising: in response to oil dilution being higher than a threshold, operating an engine to raise engine temperature above a threshold temperature for a duration. In this way, an engine may be periodically operated hot so as to reduce oil dilution. At the same time, synergistic benefits in reducing fuel residence time in hybrid vehicles are also achieved.

In one example, a vehicle controller coupled in a hybrid vehicle may monitor each of a residence time of fuel in the fuel tank as well as an engine oil dilution. Engine restarts due to a prolonged fuel residence time may be adjusted based on a history of engine restarts due to stale fuel, and vice versa, so as to provide synergistic benefits. For example, in response to engine oil dilution being more than a threshold amount, an engine may be started even though a battery state of charge is sufficiently high. As an example, if elevated engine oil dilution is detected while the vehicle is in an electric mode, the vehicle may be temporarily and intentionally shifted to the electric mode, even though continued operation in the electric mode was possible and even though engine mode was not requested by a vehicle operator. A duration of engine operation as well as a target engine temperature may be adjusted based on when a last engine oil change was performed as well as based on when the engine was last started to deplete stale fuel. For example, if an engine oil change had occurred recently, the duration of operation may be decreased or the target engine temperature may be decreased. As another example, if the engine was recently started to deplete stale fuel from the fuel tank, the duration and the target engine temperature may be lowered. The duration and target temperature may be further adjusted based on whether the engine start to address the stale fuel was an engine hot start or cold start, with shorter durations and target temperatures applied if the most recent engine start was a hot start.

Likewise, intentional engine starts for the purpose of depleting stagnant fuel may be adjusted based on when the engine was last started for addressing oil dilution. For example, an engine restart due to stagnating fuel may be delayed, or run for a shorter duration if the engine was recently operated to reduce oil dilution. As another example, in response to the presence of old fuel in the fuel tank, the engine may be run with a cold start if oil dilution is lower and run with a hot start if the oil dilution is higher. In still further examples, one or more additional engine parameters may be adjusted differently based on whether the engine is started responsive to oil dilution or started responsive to fuel age. For example, spark timing adjustments may be used during engine starts responsive to oil dilution to assist in raising engine temperatures (e.g., more retarded) while spark timing adjustments may be used during engine starts responsive to fuel age to assist reducing combustion instability (less retarded).

In this way, each of stale fuel and oil dilution can be addressed in hybrid vehicles without running an engine too frequently. By adjusting intentional engine starts to deplete stale fuel based on oil dilution levels, and intentional engine starts to reduce oil dilution based on fuel residence times, an engine start can be used to both reduce water and fuel contamination of engine oil while also reducing fuel degradation, thereby providing synergistic benefits. By operating an engine to raise an engine temperature during some conditions, water and fuel contamination of engine oil can be lowered. By operating the engine to raise fuel usage during other conditions, fuel degradation can be lowered. Overall, hybrid vehicle performance is improved without degrading a vehicle operator's perception of drivability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 illustrates a high level flow chart illustrating a routine for adjusting engine operations based on a fuel age and an engine oil dilution level

DETAILED DESCRIPTION

Figure 1:
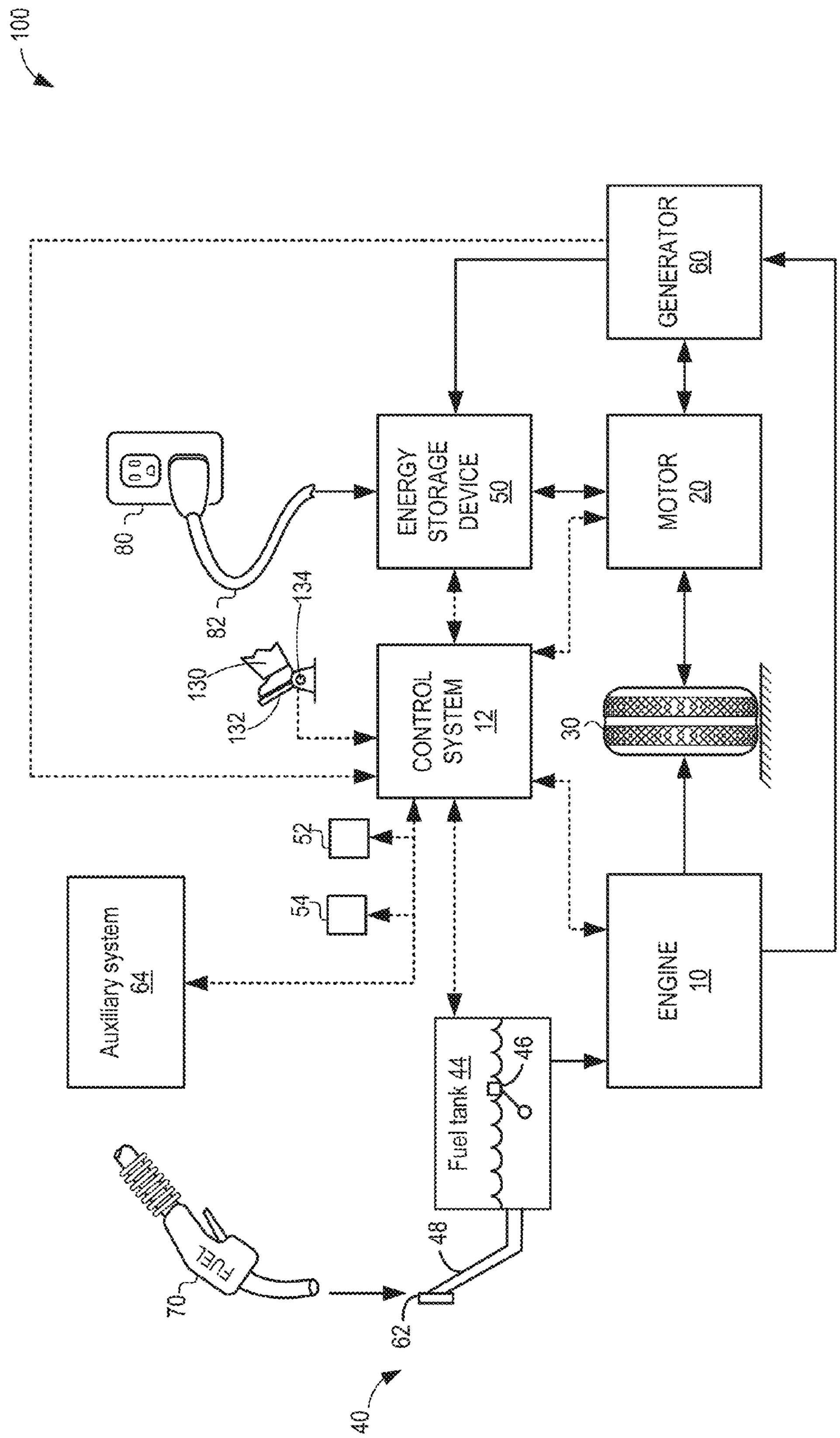
FIG. 1 illustrates an example vehicle system.

The following description relates to systems and methods for operating a hybrid electric vehicle, such as the plug-in hybrid electric vehicle of FIG. 1. Based on the age of a fuel available in the fuel tank, as well as a water and/or fuel dilution of an engine lubricating oil, an engine start and operation may be adjusted. Specifically, a controller may be configured to perform a routine, such as shown in FIG. 3, to intentionally operate an engine, even though a system battery has sufficient charge, to deplete stale fuel and/or reduce oil dilution. The routine further adjusts a duration of engine operation, as well as a target temperature of engine operation (e.g., engine hot start or cold start) based on each of an oil dilution clean-out history as well as a stale fuel clean-out history of the vehicle. The controller may estimate and update a fuel age as well as an oil dilution based on various vehicle and engine events, as elaborated at FIGS. 4-6. An example engine operation is shown at FIG. 7. In this way, each of stale fuel and oil dilution issues can be addressed in a hybrid vehicle without requiring unnecessary engine operation.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

As described herein, engine 10 may be periodically set to a deactivated state (or engine-off mode) where the consumption of fuel at the engine is significantly reduced or discontinued. When engine 10 is deactivated for extended periods of time, the fuel stored at fuel tank 44 may take a longer time to be depleted by the engine. Consequently, longer durations may elapse between fuel tank refilling events.

As elaborated herein with reference to FIGS. 3-6, the control system may be configured to determine an age of the fuel available in the fuel tank prior to engine operation. The fuel age may be estimated based on a fuel level (as determined by the fuel level sensor 46), a total distance traveled since the last fueling (e.g., as indicated on an odometer 54), and/or a total fuel consumed since the last fueling (e.g., as indicated by a fuel usage sensor). In still other embodiments, the age may be estimated based on information from an auxiliary system 64 of the vehicle. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 12 of the vehicle and a global positioning satellite via wireless communication.

In one example, fuel gauge 52, odometer 54, clock 56, and auxiliary system 64 may be coupled to a message center (not shown) on the vehicle's dashboard. The message center may include indicator light(s) and/or a text-based display in which messages are displayed to an operator, such as a message requesting an operator input to refill the fuel tank or start the engine.

As elaborated herein with reference to FIGS. 3-6, the control system may also be configured to determine an amount of dilution of engine lubricating oil with fuel and/or water over the course of vehicle operation. Oil dilution may be estimated based on engine temperatures during engine operation, as well as a duration of engine operation at the engine temperatures. For example, the control system may include a monitor or counter that is adjusted based on whether an engine incurred a hot start or a cold start. As an example, the counter may be incremented in response to an engine cold start (since a higher frequency of cold starts can add fuel and water to the oil) while the counter is decreased in response to an engine hot start (since a higher frequency of hot starts can remove fuel and water from the oil). The oil dilution may be further adjusted based on an oil change interval. For example, in response to an operator getting an oil change service performed, the oil dilution counter may be reset to indicate that here is no dilution of engine oil. In further embodiments, the oil dilution may also be estimated based on an engine oil level (as determined by a crankcase dipstick), a total distance traveled since the last engine oil change (e.g., as indicated on odometer 54), and/or a total fuel consumed since the last oil change (e.g., as indicated by a fuel usage sensor).

In one example, the various sensors and gauges may be coupled to the message center (not shown) on the vehicle's dashboard. The message center may include indicator light(s) and/or a text-based display in which messages are displayed to an operator, such as a message requesting an operator input to change the engine oil or start the engine due to elevated engine oil dilution.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
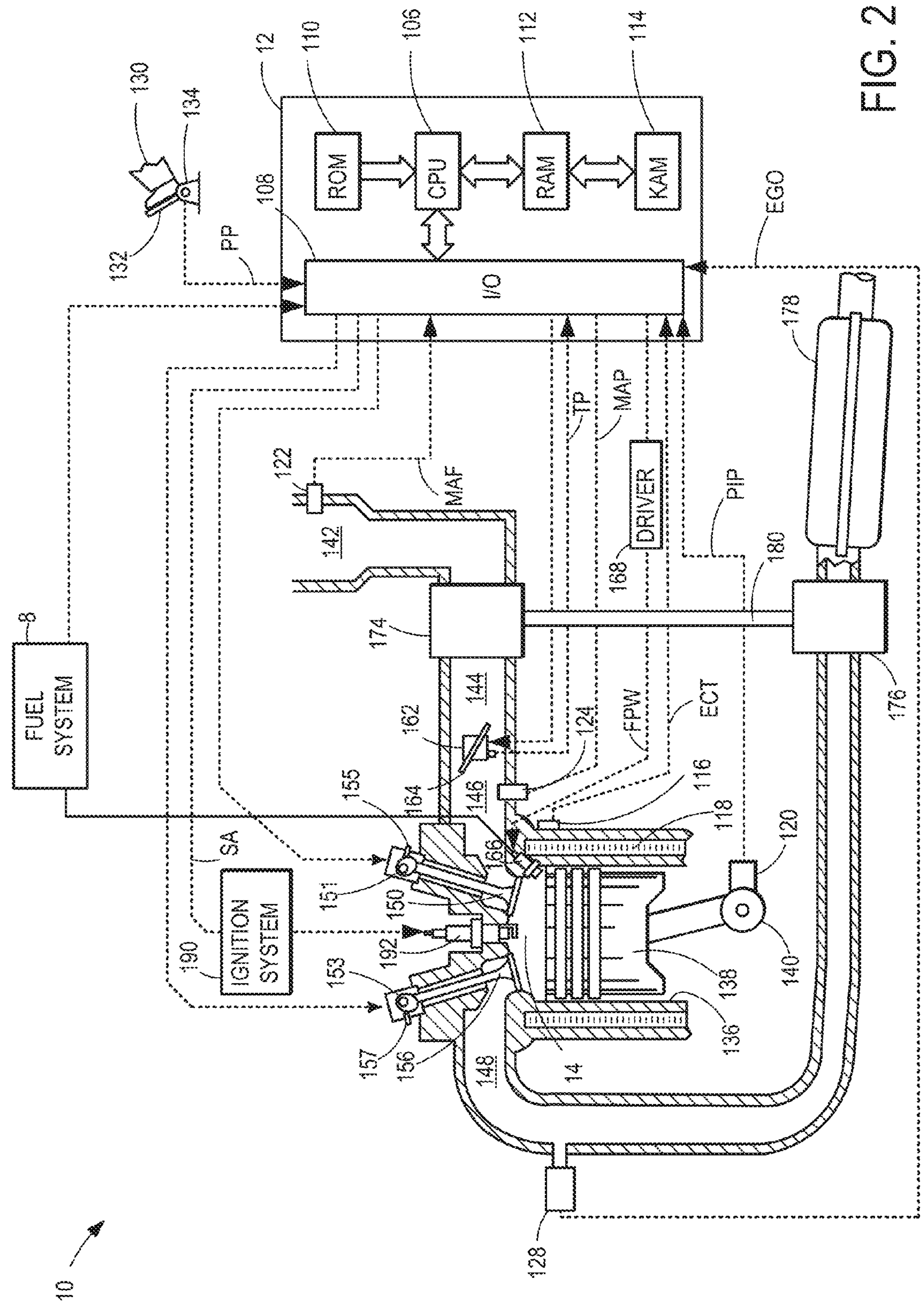
FIG. 2 illustrates an example internal combustion engine.

As elaborated in FIG. 2, controller 12 may receive input data from various sensors, process the input data, and trigger various actuators in response to the processed input data based on instruction or code programmed therein corresponding to one or more routines. Example control routines are described herein with regard to FIGS. 3 and 6.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/ exhaust valves and cams, etc. The controller may receive input data from the various sensors, process the input data, and trigger the actuators in response to the processed input data based on instruction or code programmed therein corresponding to one or more routines. Example control routines are described herein with regard to FIGS. 3 and 6.

Now turning to FIG. 3, an example method 300 is shown for intentionally operating an engine of a plug-in hybrid electric vehicle based on each of an oil dilution estimate and an age of fuel available in the fuel tank. By running an engine during conditions when electric mode of operation is possible, fuel staleness may be reduced and engine oil dilution may be reduced.

It will be appreciated that method 300 shows two independent routines that may be performed concurrently. These include an engine oil dilution clean-out routine depicted at 304-320 and a stale fuel clean-out routine depicted at 324-340. While the routines are performed independently, as elaborated herein, engine operation responsive to engine dilution clean-out requirements may affect a frequency of engine operation responsive to stale fuel clean-out requirements, and vice versa.

At 302, vehicle operating conditions may be estimated and/or inferred. For example, the control system may receive sensor feedback from one or more sensors associated with the vehicle propulsion system components, as described above. Operating conditions estimated may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

At 304, an engine oil dilution factor may be determined based on the estimated engine operating conditions. For example, an engine dilution may be determined based on an engine coolant temperature (e.g., based on a number of engine cold starts and hot starts), and further based on a duration of engine operation at or above a threshold engine temperature. As such, as the number of engine hot starts increases, or as the duration of engine operation above a threshold temperature increases, the likelihood of removing water and/or fuel contamination from the engine lubricating oil increases, and an engine oil dilution decreases. The engine oil dilution may also be based on an oil change interval. In particular, as the duration since the last oil change increases, the engine oil dilution increases due to the higher likelihood of water and fuel contaminating the oil.

In parallel with 304, at 324, the routine includes determining a residence time of fuel in the fuel tank based on the estimated operating conditions. For example, the residence time of fuel may estimated based on the distance travelled since the last fuel tank refill, an amount of fuel consumed since the last fuel tank refill or a change in fuel tank level since the last refill.

Figure 6:
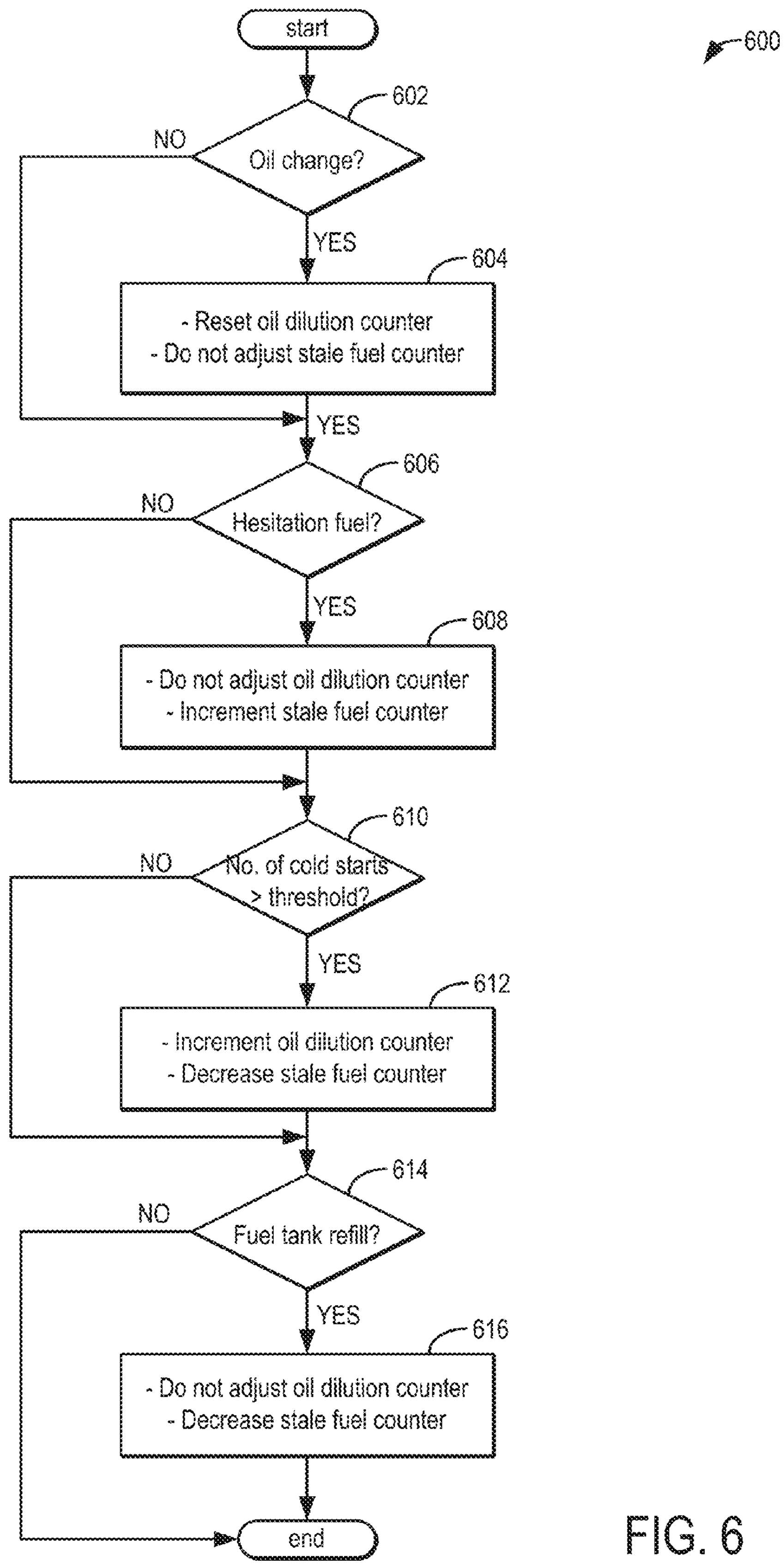
FIG. 6 illustrates a high level flow chart illustrating a routine for updating each of a fuel age counter and an oil dilution counter based on vehicle operations.
Figure 7:
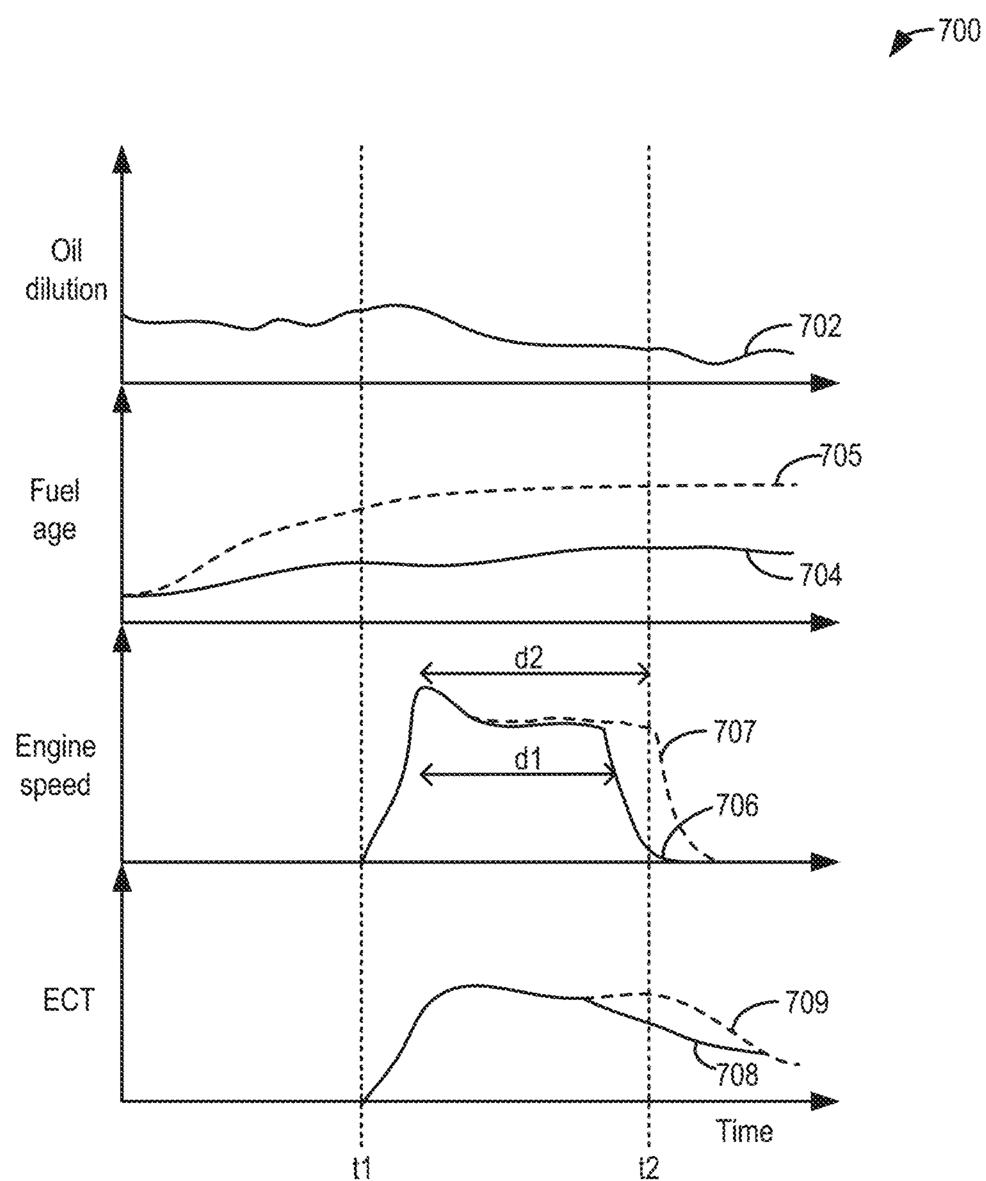
FIG. 7 illustrates example engine starts for addressing oil dilution and/or stale fuel.

As elaborated with reference to FIG. 6, the vehicle control system may include each of an engine oil dilution counter that is updated based on changes in parameters that affect engine dilution, and a fuel age counter that is updated based on changes in parameters that affect fuel age. The engine oil dilution counter, for example, may be incremented or decreased based on an oil change interval, an engine temperature, etc. Likewise, the fuel age counter may be incremented or decreased based on a fuel refill interval, fuel usage, etc.

In addition, the engine oil dilution counter may be updated in response to the engine running based on fuel age, while the fuel age counter may be updated in response to the engine running based on engine oil dilution. This is because there may be conditions when an engine is operated to reduce oil dilution while the engine is operated during other conditions to deplete stale fuel. However, even if the engine is operated to reduce oil dilution, the engine operation synergistically addresses, at least partially, stale fuel depletion. Likewise, even if the engine is operated to deplete stale fuel, the engine operation synergistically addresses, at least partially, engine oil dilution. In one example, when an engine is operated to reduce oil dilution, an initial engine operation setting (e.g., an initial engine operating speed, temperature and duration of operation) may be determined and further adjusted based on the age of the fuel. As another example, when an engine is operated to deplete stale fuel, an initial engine operation setting (e.g., an initial engine operating speed, temperature and duration of operation) may be determined and further adjusted based on the oil dilution level.

Returning to 304, after estimating an engine oil dilution level, at 306, it may be determined if the oil dilution is higher than a threshold. Upon confirming that the oil is sufficiently diluted with fuel and/or water, at 308, the vehicle driver/operator may be notified that oil dilution clean-out is required. For example, a controller may notify the vehicle operator via illumination of a malfunction indication light or by setting a message on a display on the vehicle dashboard.

Next, at 310, the routine includes retrieving an oil change and oil dilution history. This may include retrieving details regarding when a last oil change service was performed, when a last oil dilution clean-out operation was performed, a number of engine hot starts or cold starts since the last clean-out or oil change, etc. At 312, the routine includes retrieving a stale fuel clean-out history. This includes retrieving details regarding when a last fuel tank refill was performed, when a last stale fuel clean-out operation was performed, a number of engine hot starts or cold starts since the last clean-out or tank refill, etc.

At 314, the routine includes determining details of an engine oil dilution clean-out operation based on the oil dilution history and stale fuel history (retrieved at 310 and 312, respectively). In particular, an engine speed at which the engine will be operated, the duration of engine operation, the target temperature to which an engine temperature will be raised for the duration, etc., may be determined.

At 316, it may be determined if a pull-down inhibit timer has exceeded a threshold. If the inhibit pull-down timer has not exceeded the threshold time, then at 342, the routine includes inhibiting an engine pull-down for a preset duration (d1) each occurrence during which time the inhibit pull-down timer is incremented. In one example, the engine pull-down inhibit preset duration d1 is 180 seconds. If oil dilution causes the pull-down to be inhibited beyond a threshold (e.g. 6 minutes), more aggressive means of heating the engine are used, such as raising engine speed and load. Additionally, if the trip ends with the oil dilution still high and the inhibit pull-down timer above a threshold, the subsequent charging event will charge the battery to a lower state of charge to ensure the engine will run to heat the engine oil on the next driving cycle. It should be noted that the inhibit engine timer is cleared when the oil dilution is within acceptable limits.

If the inhibit pull-down timer has exceeded the threshold time, then at 318, the routine includes operating the engine as per the settings determined at 314. In particular, the engine may be operated to raise engine temperature to a target temperature, and maintain engine operation at or above the target temperature for the determined duration so as to reduce oil dilution. In addition, a first of engine operating parameters may be adjusted during the engine operation to assist in the oil dilution clean-out. For example, spark timing may be retarded during engine operation to reduce oil dilution so as to assist in raising the engine temperature to the target temperature to remove water and fuel from the oil.

At 320, upon performing the engine operation for oil dilution clean-out, the oil dilution history may be updated. For example, an oil dilution counter may be reset and an oil dilution clean-out required flag may be removed. In addition, the stale fuel counter may be updated. For example, in response to the engine operation (even though it was not directly responsive to a fuel age), a stale fuel counter may be decremented.

Returning to 304, after estimating a fuel residence time, at 326, it may be determined if the residence time of the fuel (that is, a fuel age) is higher than a threshold. Upon confirming that the fuel is sufficiently stale, at 318, the vehicle driver/operator may be notified that a stale fuel clean-out is required. For example, a controller may notify the vehicle operator via illumination of a malfunction indication light or by setting a message on a display on the vehicle dashboard.

Next, at 330, the routine includes retrieving the stale fuel clean-out history, such as details regarding when a last fuel tank refill was performed, when a last stale fuel clean-out operation was performed, a number of engine hot starts or cold starts since the last clean-out or tank refill, etc. At 332, the routine includes retrieving the oil change and oil dilution history, such as details regarding when a last oil change service was performed, when a last oil dilution clean-out operation was performed, a number of engine hot starts or cold starts since the last clean-out or oil change, etc.

At 334, the routine includes determining details of a stale fuel clean-out operation based on the oil dilution history and stale fuel history (retrieved at 330 and 332, respectively). In particular, an engine speed at which the engine will be operated, a duration of engine operation, a target temperature to which an engine temperature will be raised for the duration, injection details for the engine operation, an amount of fuel to be depleted during the clean-out operation, etc., may be determined.

At 336, it may be determined if the pull-down inhibit timer has exceeded the threshold. If the inhibit pull-down timer has not exceeded the threshold time, the routine proceeds to 342 to inhibit an engine pull-down for the preset duration (d1). If the inhibit pull-down timer has exceeded the threshold time, then at 338, the routine includes operating the engine as per the settings determined at 334. In particular, the engine may be operated to raise engine temperature to a target temperature, and maintain engine operation at or above the target temperature for the determined duration so as to deplete stale fuel from the fuel tank. In addition, a second of engine operating parameters (different from the first set of engine operating parameters) may be adjusted during the engine operation to assist in the oil dilution clean-out. For example, a throttle opening may be increased during engine operation to increase fuel usage so as to assist in depleting the stale fuel from the fuel tank.

At 340, upon performing the engine operation for stale fuel clean-out, the stale fuel clean-out history may be updated. For example, a stale fuel counter may be reset or decremented and a stale fuel clean-out required flag may be removed. In addition, the engine oil dilution counter may be updated. For example, in response to the engine operation (even though it was not directly responsive to engine dilution), an engine dilution counter may be decremented.

In this way, by operating an engine responsive to any of engine oil dilution and fuel age being higher than respective thresholds, and by adjusting each operation while taking into consideration the other operation, synergistic benefits can be achieved. In particular, an oil dilution can be addressed while also reducing an amount of stale fuel in a fuel tank.

Figure 4:
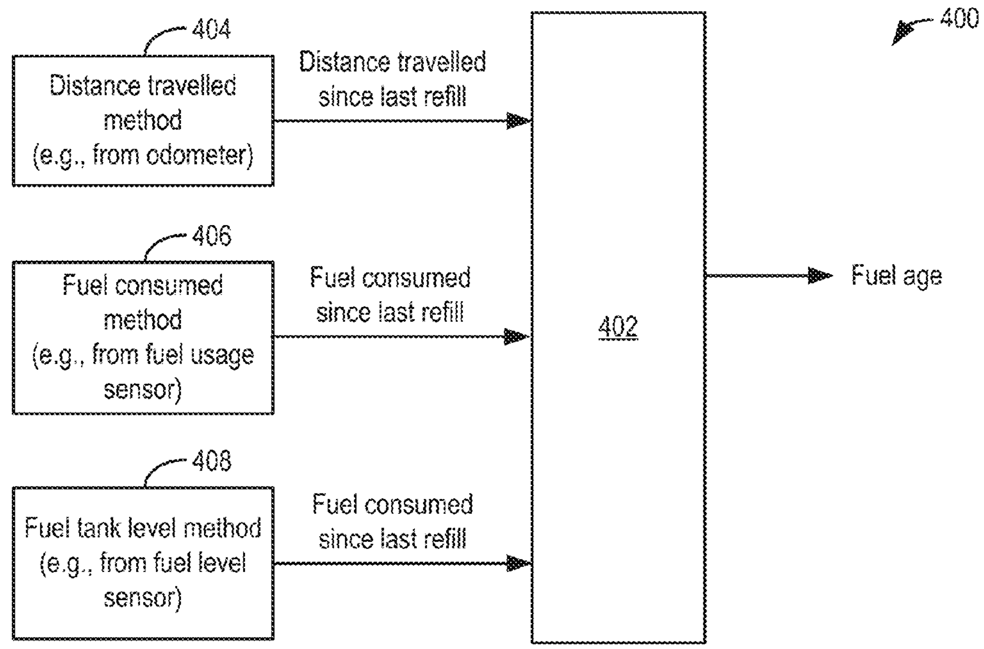
FIG. 4 illustrates example methods for determining the fuel age of fuel stored in the vehicle system of FIG. 1.

Now turning to FIG. 4, a schematic method 400 is shown for estimating the age of fuel available in the fuel tank of a vehicle, such as a plug-in hybrid electric vehicle, wherein fuel usage may be lower due to frequent charging of an on-board energy storage device and higher usage of an electric motor to propel the vehicle. A controller (or control system) 402, may be configured with computer readable instructions and algorithms for estimating a fuel age in the vehicle's fuel tank. As previously elaborated in FIG. 3, engine operation may be adjusted (e.g., initiated or extended) if the available fuel in the fuel tank is too old and stale.

In one example, at 404, the age of the fuel is estimated based on a distance travelled since a last refilling of the fuel tank. The distance travelled may be determined by, for example, an odometer of the vehicle. The controller may monitor the distance traveled per day by the vehicle (e.g., an actual distance traveled per day by the vehicle, or an average distance traveled by the vehicle, as averaged over a predefined duration), and calculate the fuel age based on the distance traveled.

In another example, at 406, the age of the fuel is estimated based on an amount of fuel consumed since a last refilling of the fuel tank. The amount of fuel consumed may be determined by, for example, a fuel usage sensor of the vehicle. The controller may monitor the fuel consumed per day by the vehicle versus the distance traveled per day by the vehicle (e.g., actual distance or average distance), and calculate the fuel age based on the total fuel consumed versus the distance traveled.

In yet another example, at 408, the age of the fuel is estimated based on a fuel level output of a fuel level sensor coupled to the fuel tank. The controller may monitor the fuel level in the fuel tank when traveled per day by the vehicle versus the distance traveled per day by the vehicle (e.g., actual distance or average distance), and calculate the fuel age based on the fuel level versus the distance traveled.

In still further examples, the fuel age may be estimated based on the measured efficiency of cold-start combustion of the fuel. The measured efficiency of cold-start combustion may be determined based on an estimated engine torque and/or speed during a run-up in engine speed from cranking operation. For example, the expected engine speed run-up profile (e.g., expected speed for a given combustion event number from a first combustion event of the start from rest) can be compared with actual speed measurements, and a difference therebetween may provide an indication of the effective age of the fuel.

Figure 5:
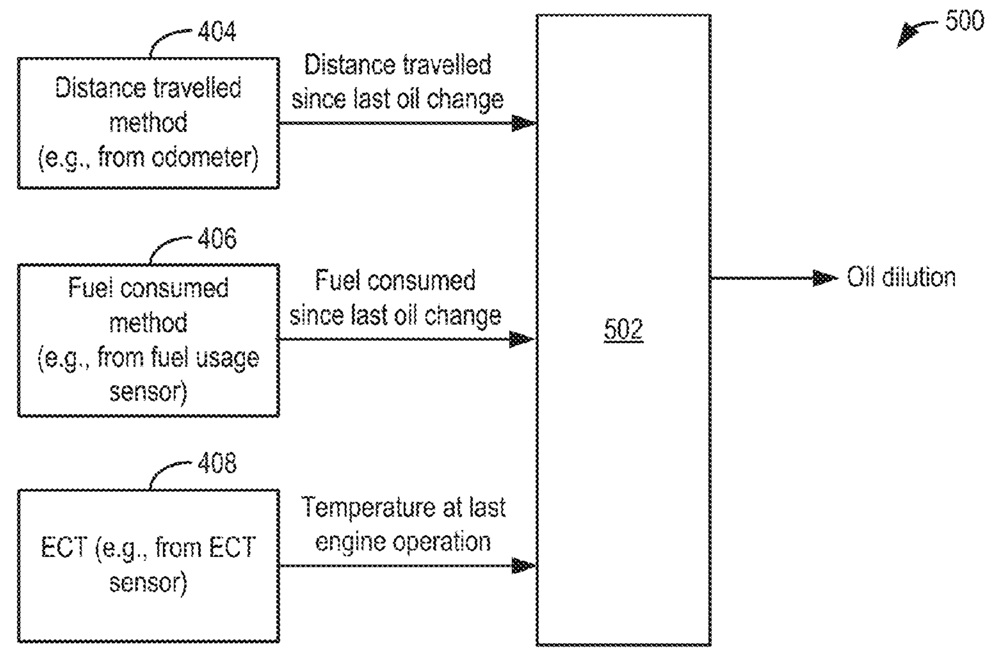
FIG. 5 illustrates example methods for determining the dilution of engine lubricating oil used in the vehicle system of FIG. 1.

Now turning to FIG. 5, a schematic method 500 is shown for estimating a fuel or water dilution or contamination of engine lubricating oil in the engine of a vehicle, such as a plug-in hybrid electric vehicle, wherein engine operation and engine hot starts may be lower due to frequent charging of an on-board energy storage device and higher usage of an electric motor to propel the vehicle. A controller (or control system) 502, may be configured with computer readable instructions and algorithms for estimating engine oil dilution. As previously elaborated in FIG. 3, engine operation may be adjusted (e.g., initiated or extended) if the engine oil is contamination with too much water and/or fuel.

In one example, at 504, the oil dilution is estimated based on a distance travelled since a last oil change. The distance travelled may be determined by, for example, an odometer of the vehicle. The controller may monitor the distance traveled per day by the vehicle (e.g., an actual distance traveled per day by the vehicle, or an average distance traveled by the vehicle, as averaged over a predefined duration), and calculate the likely oil dilution based on the distance traveled, as well as based on a percentage of that distance travelled in engine mode relative to electric mode.

In another example, at 506, the oil dilution is estimated based on an amount of fuel consumed since a last oil change. The amount of fuel consumed may be determined by, for example, a fuel usage sensor of the vehicle. The controller may monitor the fuel consumed per day by the vehicle versus the distance traveled per day by the vehicle (e.g., actual distance or average distance), and calculate the fuel contamination in the engine oil based on the total fuel consumed versus the distance traveled, as well as based on a percentage of that distance travelled in engine mode relative to electric mode In yet another example, at 508, the oil dilution is estimated based on an engine temperature. The controller may monitor the engine temperature during engine mode of operation to determine what temperature the engine is operated at, and how long the engine is operated at that temperature. The controller may also monitor a number of engine cold-starts relative to engine hot-starts during vehicle travel in engine mode, and calculate the oil dilution accordingly.

Now turning to FIG. 6, routine 600 shows an example method for updating each of a fuel age counter and an oil dilution counter of a vehicle control system responsive to various vehicle events and operations. By adjusting engine operation based on the output of the fuel age counter or the oil dilution counter exceeding a threshold, each of stale fuel and dilute engine oil issues in a hybrid vehicle can be addressed.

At 602, the routine includes determining if an oil change service has occurred. In one example, a vehicle operator may indicate that an oil change service has been performed. In another example, an oil change service may be indicated in response to a change in engine oil level in the crankcase. If an oil change has recently occurred, at 604, an oil dilution counter may be reset to indicate that the engine oil is not diluted (but rather, is fresh). However, no adjustments may be made to a stale fuel counter.

From 602 or 604, the routine proceeds to 606 to determine if hesitation fuel has been detected. In one example, hesitation fuel may be determined in response to variability in engine cold-start combustion. In response to the detection of hesitation fuel, at 608, the stale fuel counter may be incremented to indicate that the fuel is stale. However, no adjustments may be made to the oil dilution counter. Alternatively, the oil dilution counter may be decremented.

From 606 or 608, the routine proceeds to 610 to determine a number of engine cold-starts relative to a threshold number. For example, a number of engine cold starts over the current vehicle drive cycle may be determined and compared to the threshold number. In other examples, a number of engine cold-starts over a duration or distance of vehicle travel may be compared to the threshold number. If the number exceeds the threshold number, then at 612, the routine includes incrementing the oil dilution counter and decreasing the stale fuel counter. In particular, the oil dilution counter is incremented due to the inability of an engine cold start to produce sufficient heat to remove water or fuel contamination from engine oil. However, the stale fuel counter is decreased due to the usage of fuel during the cold start. For example, the stale fuel counter may decreased to reflect that there is less stale fuel in the fuel tank, although the staleness of the fuel would remain unaffected.

From 610 and 612, the routine proceeds to 614 to determined if a fuel tank refill event has occurred. In one example, a fuel tank refill event is confirmed based on a change in fuel level, as indicated by a fuel level sensor coupled in the fuel tank. In response to the fuel tank refill event, at 616, the oil dilution counter is not adjusted but the stale fuel counter is decreased in view of the receipt of new and fresh fuel.

An example engine operation is now shown at FIG. 7. In particular, map 700 shows oil dilution at plot 702, fuel age at plot 704, engine speed at plot 706, and engine coolant temperature (as an indication of engine temperature) at plot 708.

Prior to t1, the hybrid vehicle may be operating in an electric mode with the vehicle being propelled with power from a battery and with the engine not being operated. Due to the reduced frequency of engine operation, an engine lubricating oil may incur contamination with fuel and/or water causing a gradual increase in oil dilution as a number of engine cold starts increase (plot 702). Likewise, due to reduced usage of fuel, a fuel age may gradually increase (plot 704).

At t1, in response to an engine oil dilution being higher than a threshold, an engine oil clean-out routine is initiated. Therein, an engine is operated (herein started) intentionally, even though a battery state of charge is high enough to allow the vehicle to be propelled via the battery. In response to the engine start, an engine speed may start to increase (plot 706) and an engine temperature may also rise (plot 708). Engine operation may be continued with the engine running at an engine speed that allows the engine temperature to be maintained at or above a target temperature for a duration d1 (plots 706, 708, solid lines). Duration d1 may correspond to an inhibit pull-down time and may be based on an inhibit pull-down time noted by an inhibit pull-down timer. As such, the timer may be increased as the engine oil dilution increases and then reset once the oil dilution clean-out routine is completed. By operating the engine for the duration at or above the target temperature, the engine may be made to operate sufficiently hot to at least partially remove water and/or fuel contamination from the engine oil. As a result of the hot engine operation, an engine oil dilution may decrease below the threshold by t2. Engine operation may then be discontinued and the vehicle may resume an electric mode of operation. As such, during the operation depicted at plots 706, 708, a fuel age may not be higher than a threshold (plot 704). That is, the fuel may not be sufficiently stale.

An alternate example is shown at plots 705, 707, 709 (dashed lines). Herein, at t1, in response to the engine oil dilution being higher than the threshold, the engine oil clean-out routine is initiated. However, due to the fuel age being higher than a threshold (plot 705), engine operation responsive to the oil dilution may be adjusted. In particular, the engine is operated (herein started) intentionally, even though a battery state of charge is high enough to allow the vehicle to be propelled via the battery, with an engine speed setting and duration of engine elevated relative to the engine operation responsive to oil dilution where fuel was at a lower age. As depicted, the engine may be started at t1 and the engine speed may be raised to a higher speed that allows the engine temperature to be maintained at or above a higher target temperature for a longer duration d2 (plots 707, 709, dashed lines). Duration d2 may correspond to an inhibit pull-down time and may be based on an inhibit pull-down time noted by an inhibit pull-down timer. As such, the timer may be increased as the engine oil dilution increases and further increased as the fuel age increases. Then, once the oil dilution clean-out routine is completed, the timer may be reset. By operating the engine for the duration at or above the target temperature, the engine may be made to operate sufficiently hot to at least partially remove water and/or fuel contamination from the engine oil as well as deplete some stale fuel from the fuel tank. As a result of the hot engine operation, an engine oil dilution may decrease below the threshold by t2 and a decrease in an amount of stale fuel may be noted by the controller. Engine operation may then be discontinued and the vehicle may resume an electric mode of operation.

In one example, in response to oil dilution being higher than a threshold, an engine coupled in a hybrid vehicle may be operated to raise engine temperature above a threshold temperature for a duration. The duration may be based on a difference between the oil dilution and the threshold, the duration increased as the difference increases. The threshold temperature may be based on the difference between the oil dilution and the threshold, the threshold temperature increased as the difference increases. One or more of the duration and the threshold may be further adjusted based on a residence time of fuel in a fuel tank. As such, the oil dilution may be estimated based on an engine coolant temperature and a number of engine cold starts over a vehicle drive cycle. In particular, estimating engine oil dilution based on a number of engine cold starts over a vehicle drive cycle may include estimating engine oil dilution based on a number of engine starts above the threshold temperature over the vehicle drive cycle. The hybrid vehicle may further include a battery and operating the engine may include starting the engine while a state of charge of the battery is higher than a threshold charge. Alternatively, operating the engine may include extending operation of an already operating engine while the state of charge of the battery is higher than the threshold charge. In addition, operating the engine to raise engine temperature above a threshold temperature may include operating the engine with one or more of spark ignition timing, EGR and VCT at a first setting that increases an in-cylinder combustion temperature.

In another example, a method for an engine coupled in a hybrid vehicle, includes, during a first condition, when engine oil dilution is higher than a threshold dilution and while a battery state of charge is higher than a threshold charge, starting the engine to raise an engine temperature above a threshold temperature. In comparison, during a second condition, when a fuel age is higher than a threshold age and while the battery state of charge is higher than the threshold charge, the method includes starting the engine to deplete fuel in a fuel tank. Further, during a third condition, when the battery state of charge is lower than the threshold charge, the method includes starting the engine to charge the battery.

Herein, during the first condition, the engine is started with one or more of spark ignition timing, EGR and VCT at a first setting that increases an in-cylinder combustion temperature; while during the second condition, the engine is started with one or more of spark ignition timing, EGR and VCT at a second, different setting that increases fuel consumption; and during the third condition, the engine is started with one or more of spark ignition timing, EGR and VCT at a third setting, different from each of the first and second settings, that increases a cylinder output torque. The engine start during the first condition may include an engine hot start, and the engine may be operated for a first duration. In comparison, the engine start during the second condition may include an engine cold start, where the engine is operated for a second duration that is shorter than the first duration. In some embodiments, during the first condition, a fuel injection timing may also be adjusted to reduce wall spray in an engine cylinder.

In still another example, during a first mode of vehicle operation, when fuel age is lower than a threshold age, an engine may be started responsive to an oil dilution being higher than a threshold dilution. Then, during a second mode of vehicle operation, when oil dilution is lower than the threshold dilution, the engine may be started responsive to the fuel age being higher than the threshold age. Herein, during each of the first and second modes, a battery state of charge may be higher than a threshold charge. In addition, during the first mode, starting the engine includes performing an engine hot start where the engine temperature is higher than a threshold temperature; while during the second mode, starting the engine includes performing an engine cold start where the engine temperature is lower than the threshold temperature. In one example, during the first mode, a spark ignition timing may be advanced (to increase engine temperature) while during the second mode, the spark ignition timing is retarded (to reduce engine output torque and increase fuel usage).

In yet another example, a method for a hybrid vehicle includes, during vehicle operation, monitoring each of an engine oil dilution and a fuel age, starting an engine responsive to one of the oil dilution being higher than a threshold dilution and the fuel age being higher than a threshold age, selectively updating only an oil dilution monitor based on an oil change interval and selectively updating only a fuel age monitor based on hesitation fuel detection.

In still another example, a method for an engine in a hybrid vehicle includes, in response to oil dilution being higher than a threshold, operating an engine to raise engine temperature above a threshold temperature for a duration, wherein said engine operation with raised temperature is further adjusted based on an age of fuel stored in a fuel tank. Operating the engine may further include starting the engine and operating the engine at a first speed and load for a first duration to raise the engine temperature above the threshold temperature. Engine operation may be further adjusted based on the age of fuel stored in the fuel tank. For example, as the age of the fuel increases, the engine may be operated at a second speed and load, higher than the first speed for the first duration. As another example, as the age of the fuel increases, the engine may be operated at the first speed and load for a second duration longer than the first duration. Further still, as the age of the fuel increases, the engine may be operated at the second speed and load for the second, longer duration.

In this way, each of stale fuel and oil dilution can be addressed in hybrid vehicles without degrading fuel economy. By operating an engine to deplete stale fuel based on oil dilution levels during some conditions, and operating the engine to reduce oil dilution based on fuel residence times during other conditions, an engine start can be advantageously used to both reduce water and fuel contamination of engine oil while also reducing fuel degradation, thereby providing synergistic benefits. Overall, hybrid vehicle performance is improved without degrading a vehicle operator's perception of drivability. Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a hybrid vehicle, comprising:

in response to oil dilution being higher than a threshold while a battery state of charge is higher than a threshold charge, operating an engine to raise engine temperature above a threshold temperature for a duration, wherein one or more of the duration and the threshold temperature is adjusted based on a stale fuel clean-out history.

2. The method of claim 1, wherein the one or more of the duration and the threshold temperature is lowered based on the engine being previously started to deplete stale fuel, the duration and the threshold temperature further based on a difference between the oil dilution and the threshold, the duration increased as the difference increases.

3. The method of claim 2, wherein the one or more of the duration and the threshold temperature is further adjusted based on whether the engine start to deplete stale fuel was a hot start or a cold start, the duration and the threshold temperature lowered when the engine start was a hot start.

4. The method of claim 1, wherein the oil dilution is estimated based on an engine coolant temperature and a number of engine cold starts relative to a number of engine hot starts over a vehicle drive cycle, the oil dilution increased in response to an engine cold start, the oil dilution decreased in response to an engine hot start, the engine hot start including an engine start above the threshold temperature.

5. The method of claim 1, further comprising, in response to stale fuel, operating the engine based on a fuel age and further based on the oil dilution, the engine run with a cold start responsive to the stale fuel if the oil dilution is lower, the engine run with a hot start responsive to the stale fuel if the oil dilution is higher.

6. The method of claim 5, wherein operating the engine in response to oil dilution being higher than the threshold includes starting the engine with spark timing more retarded, and wherein operating the engine in response to stale fuel includes starting the engine with spark timing less retarded.

7. The method of claim 1, wherein the hybrid vehicle includes a battery and wherein operating the engine includes extending operation of an already operating engine while a state of charge of the battery is higher than a threshold charge, the method further comprising, during a subsequent charging event, charging the battery to a lower state of charge.

8. The method of claim 5, wherein operating an engine to raise engine temperature above a threshold temperature includes operating the engine with one or more of spark ignition timing, EGR and VCT at a first setting that increases an in-cylinder combustion temperature, and wherein operating the engine in response to the stale fuel includes operating the engine with one or more of spark ignition timing, EGR and VCT at a second setting that increases cylinder fuel consumption.

9. A method for an engine coupled in a hybrid vehicle, comprising:

during a first condition, when engine oil dilution is higher than a threshold dilution and while a battery state of charge is higher than a threshold charge, starting the engine to raise an engine temperature above a threshold temperature;

during a second condition, when a fuel age is higher than a threshold age and while the battery state of charge is higher than the threshold charge, starting the engine to deplete fuel in a fuel tank;

during both the first and second condition, updating each of the engine oil dilution and the fuel age responsive to the starting the engine; and during a third condition, when the battery state of charge is lower than the threshold charge, starting the engine to charge the battery.

10. The method of claim 9, wherein during the first condition, the engine is started with a first set of engine operating parameters including one or more of spark ignition timing, EGR and VCT at a first setting that increases an in-cylinder combustion temperature; wherein during the second condition, the engine is started with a second set of engine operating parameters including one or more of a throttle opening, spark ignition timing, EGR and VCT at a second, different setting that increases fuel consumption; and wherein during the third condition, the engine is started with one or more of spark ignition timing, EGR and VCT at a third setting, different from each of the first and second settings, that increases a cylinder output torque.

11. The method of claim 9, wherein the engine start during the first condition includes an engine hot start, and wherein the engine is operated for a first duration; wherein the engine start during the second condition includes an engine cold start, and wherein the engine is operated for a second duration shorter than the first duration.

12. The method of claim 9, wherein during the first condition, a fuel injection timing is adjusted to reduce wall spray in an engine cylinder.

13. A method for an engine coupled to a hybrid vehicle, comprising:

during a first mode of vehicle operation, when fuel age is lower than a threshold age, starting the engine responsive to an oil dilution being higher than a threshold dilution and decrementing each of the fuel age and the oil dilution responsive to the engine starting; and during a second mode of vehicle operation, when oil dilution is lower than the threshold dilution, starting the engine responsive to the fuel age being higher than the threshold age and decrementing each of the fuel age and the oil dilution responsive to the engine starting.

14. The method of claim 13, wherein during each of the first and second modes, a battery state of charge is higher than a threshold charge.

15. The method of claim 14, wherein during the first mode, starting the engine includes performing an engine hot start where the engine temperature is higher than a threshold temperature; and wherein during the second mode, starting the engine includes performing an engine cold start where the engine temperature is lower than the threshold temperature.

16. The method of claim 15, wherein during the first mode, a spark ignition timing is advanced and wherein during the second mode, the spark ignition timing is retarded.

17. A method for a hybrid vehicle, comprising:
during a vehicle drive cycle,
monitoring each of an engine oil dilution and a fuel age;
starting an engine responsive to one of the oil dilution being higher than a threshold dilution and the fuel age being higher than a threshold age;
selectively updating only an oil dilution monitor based on an oil change interval;
selectively updating only a fuel age monitor based on a fuel tank refill;
updating each of the oil dilution monitor and the fuel age monitor responsive to the engine starting; and
further updating each of the oil dilution monitor and the fuel age monitor based on a number of engine cold starts over the vehicle drive cycle.

18. A method for an engine in a hybrid vehicle, comprising:
during a vehicle drive cycle, in response to oil dilution being higher than a threshold, operating an engine to raise engine temperature above a threshold temperature for a duration, wherein said engine operation with raised temperature is further adjusted based on an age of fuel stored in a fuel tank and prior engine operation over the drive cycle responsive to the age of the fuel.

19. The method of claim 18, wherein operating the engine includes starting the engine and operating the engine at a first speed and load for a first duration to raise the engine temperature above the threshold temperature.

20. The method of claim 19, wherein further adjusting engine operation based on the age of fuel stored in the fuel tank includes, as the age of the fuel increases, operating the engine at a second speed and load, higher than the first speed for the first duration.

21. The method of claim 19, wherein further adjusting engine operation based on the age of fuel stored in the fuel tank includes, as the age of the fuel increases, operating the engine at the first speed and load for a second duration longer than the first duration.

* * * * *